United States Patent
Maekawa

(10) Patent No.: US 8,498,062 B2
(45) Date of Patent: *Jul. 30, 2013

(54) OPTICAL SYSTEM

(75) Inventor: Satoshi Maekawa, Tokyo (JP)

(73) Assignee: National Institute of Information and Communications Technology, Koganei-shi, Tokyo (JP)

(*) Notice: Subject to any disclaimer, the term of this patent is extended or adjusted under 35 U.S.C. 154(b) by 967 days.

This patent is subject to a terminal disclaimer.

(21) Appl. No.: 12/519,906

(22) PCT Filed: Dec. 19, 2007

(86) PCT No.: PCT/JP2007/074394
§ 371 (c)(1),
(2), (4) Date: Jun. 18, 2009

(87) PCT Pub. No.: WO2008/075700
PCT Pub. Date: Jun. 26, 2008

(65) Prior Publication Data
US 2009/0310231 A1    Dec. 17, 2009

(30) Foreign Application Priority Data
Dec. 21, 2006   (JP) .................................. 2006-345084

(51) Int. Cl.
*G02B 17/00* (2006.01)
(52) U.S. Cl.
USPC ............................ 359/726; 359/642; 359/733
(58) Field of Classification Search
USPC .......................................... 359/733, 642, 726
See application file for complete search history.

(56) References Cited

U.S. PATENT DOCUMENTS

| 4,492,442 A | 1/1985 | Gaudyn |
| 7,965,448 B2 * | 6/2011 | Maekawa ....................... 359/629 |

(Continued)

FOREIGN PATENT DOCUMENTS

EP   2009469 A1   12/2008

(Continued)

OTHER PUBLICATIONS

International Search Report of PCT/JP2007/074394, Mailing Date of Mar. 25, 2008.
Chinese Office Action dated Apr. 6, 2010, issued in corresponding Chinese Patent Application No. 200780047269.3, English translation Only (1 page).
Korean Office Action dated Apr. 12, 2011, issued in corresponding Korean Patent Application No. 10-2009-7015106, with English translation (5 pgaes).

(Continued)

*Primary Examiner* — Scott J Sugarman
(74) *Attorney, Agent, or Firm* — Westerman, Hattori, Daniels & Adrian, LLP

(57) ABSTRACT

An optical system having a novel imaging method of forming an image of a subject of projection in space the same as if the image were being reflected from a mirror where a mirror does not actually exist is provided, the optical system being provided with a light beam redirecting surface that functions to transmit light while refracting the light and form a real image at a plane-symmetric position, and a mirror surface arranged facing the light beam redirecting surface; in which, by transmitting light emitted from the subject of projection through the light beam redirecting surface, reflecting the transmitted light at the mirror surface, and again transmitting the reflected light through the light beam redirecting surface, an image of a subject of projection arranged at a position on an observation side opposite the mirror surface arranged on the other side across the light beam redirecting surface is formed at a position that is plane-symmetric to the mirror surface with respect to the light beam redirecting surface to which a virtual mirror that does not exist as a substantial body has been moved.

9 Claims, 10 Drawing Sheets

U.S. PATENT DOCUMENTS

| | | | |
|---|---|---|---|
| 8,057,043 B2 * | 11/2011 | Maekawa | 353/10 |
| 2004/0263964 A1 | 12/2004 | Okano et al. | |
| 2006/0170616 A1 | 8/2006 | Hirayama et al. | |

FOREIGN PATENT DOCUMENTS

| | | |
|---|---|---|
| JP | 2004-40722 A | 2/2004 |
| WO | 03/088419 A1 | 10/2003 |
| WO | 2007-116639 A1 | 10/2007 |

OTHER PUBLICATIONS

Extended European Search Report dated Jan. 5, 2012, issued in corresponding European Patent Application No. 07850864.5 (6 pages).

Satoshi Maekawa et al., "Transmissive Optical Imaging Device with Micromirror Array"; Proc. of SPIE; vol. 6392; pp. 63920E-1 thru 63920E-8 (2006).

* cited by examiner (a)

(b)

(a)

(b)

OPTICAL SYSTEM

FIELD OF THE INVENTION

The present invention relates to a new type of optical system that functions like a mirror used to reflect light or transmit light.

BACKGROUND OF THE INVENTION

In the case of an image reflected in a plane mirror, because the light beams of the reflected light occurring at the surface of the mirror appear to come from a direction extending into the interior of the mirror to the eyes of an observer, an image reflected in a plane mirror (a mirror image) is formed as a virtual image within the interior of the mirror (see, for example, Non-patent Reference No. 1).

Non-patent Reference No. 1—The definition of "virtual image" from the Wikipedia Website on the Internet, accessed on the Oct. 23, 2006, at: <URL:http://en.wikipedia.org/wiki/Virtual_image>

SUMMARY OF THE INVENTION

Problems to be Solved by the Invention

A mirror image that is reflected in a plane mirror is formed in the interior space of the mirror, which is in a relationship that is plane-symmetrical to the real object (a subject of projection) with respect to the surface of the mirror; therefore, it is not possible for an observer to extend an arm or the like and access the image.

It is an object of the present invention to provide a new type of optical system in which a mirror image of a real object including three dimensions is formed in space as if it had been reflected from a mirror that does not exist as a substantial body, but virtually exists in space.

Means for Solving the Problems

That is to say, the present invention is provided with a light beam redirecting surface which functions to bend light while transmitting the light, and to form a real image from the transmitted light at a plane-symmetric position on the other side of the light beam redirecting surface, and a mirror surface arranged at a position facing the light beam redirecting surface; in which, by transmitting light that has been emitted from the subject of projection through the light beam redirecting surface, reflecting the transmitted light from the mirror surface, and again transmitting the reflected light through the light beam redirecting surface, an image of a subject of projection that has been arranged on an observation side opposite that on which the mirror surface that has been arranged across the light beam redirecting surface is formed at a position that is in plane symmetry to the mirror surface with respect to the light beam redirecting surface as if reflected in a virtual mirror that does not actually exist.

In other words, as shown in the conceptual diagram in FIG. 1 (FIG. 1a shows a mirror surface 2 arranged at a diagonal with respect to a light beam redirecting surface 1, and FIG. 1b shows the mirror surface placed in a position that is parallel to the light beam redirecting surface 1), first, because light beams reflected by a subject of projection O (i.e., light beams that are emitted from the subject of projection, which is shown as a point in the drawing), progresses along a path that is plane-symmetric to the incident light when the light is transmitted through the light beam redirecting surface 1, though the light should form an image of the subject of projection at a position I1 shown in the drawings, due to the presence of the mirror surface 2, the image that should have been formed at the position I1 is actually formed at a position I2, which is in plane symmetry with the mirror surface 2. After light emitted from the image formed at the position I2 is again transmitted and refracted by the light beam redirecting surface 1, because the light follows a path that is in plane symmetry with the light beam redirecting surface 1, an image is formed by the aforementioned light at a position I3 located on the same side of the light beam redirecting surface 1 as the subject of projection O. The image formed at the position I3 is in the same relation that would occur if the image of the subject of projection had been reflected in a virtual mirror 3 (shown by the dotted line in the drawings) at a position in plane symmetry to the mirror surface 2 with respect to the light beam refracting surface 1. That is to say, by arranging the light beam redirecting surface 1 on the observation side of the mirror surface 2, it becomes possible to virtually move the mirror surface 2 to a plane-symmetric position with respect to the light beam redirecting surface 1; as a result, it becomes possible for an observer to view an image of the subject of projection O at the position I3 that appears as if it were floating in space reflected in a virtual mirror 3 that does not physically exist as a substantial body.

As an example of an optical system such as that described above, a reflective plane-symmetric imaging element formed from a plurality of unit optical elements, which are provided with two mirror surface elements mutually perpendicular to each other, arranged in a plane, (see Patent Reference: Japanese Patent Application 2006-080009). In this case, according to the above-described reflective plane-symmetric imaging element, light transmitted from one side of the light beam redirecting surface provided with the plurality of unit imaging elements is reflected at each of the two mirrored surface portions of each of the unit optical elements, whereby, an image is formed on the other side of the light beam redirecting surface, and the aforementioned light beam redirecting surface is a surface that passes alongside the aforementioned two mirrored surface elements and forms a perpendicular angle or an angle that is close to perpendicular with the two mirrored surface elements.

According to a reflective plane-symmetric imaging element such as that described above, an image of a subject of projection arranged at a position on one side of the imaging element is formed at a plane-symmetric position on the other side of the imaging element. Accordingly, when light emitted from the subject of projection (direct light) is transmitted by the unit optical elements of the reflective plane-symmetric imaging element, after the light is reflected once at each of the two mirrored surface elements and transmitted, the light is reflected by the mirror surface to become reflected light, and when the reflected light is again transmitted by the unit optical elements, the reflected light is reflected once at each of the two mirrored surface elements, and formed as an image at the position of the virtual mirror. Continuing, because the two mirrored surface elements are arranged almost perpendicular with respect to the light beam redirecting surface, as shown in FIG. 1a, the mirror surface 2 is arranged at a position so as to form an acute angle with the light beam redirecting surface 1. Here, the position at which the mirror surface is arranged is a position set between the reflective plane-symmetric imaging element and the position at which the real image of the subject of projection would be formed by light that has been transmitted through the reflective plane-symmetric imaging element, and the angle at which the mirror surface is arranged is an angle that is appropriate for obtaining reflection once at each of the mirrored surface elements for both the direct light and the reflected light. Further, because direct light and reflected light are reflected at the two mirrored surface elements as described above, observation of the image is performed at an angle from a diagonal with respect to the reflective plane-symmetric imaging element (an acute angle with respect to the light beam redirecting surface, in particular, an angle of 30-40 degrees with respect to the normal of the reflective plane-symmetric imaging element is favorable). Note that according to the present invention, the phrase "perpendicularly or an angle that is close to perpendicular" or "almost perpendicular" means "an angle that is exactly perpendicular or angle that is within an error range of several minutes of a degree from perpendicular".

Even more specifically, the reflective plane-symmetric imaging element can be provided with a plurality of holes penetrating in a direction of a thickness of a predetermined base plate, in which a unit optical element configured from the two mirrored surface elements mutually perpendicular to each other is formed on the interior wall of each hole, and when light passes through the holes from one side of the base plate to the other, the light is reflected once at each of the two mirrored surface elements. That is to say, a reflective plane-symmetric imaging element can be made with a comparatively simple construction in which a plurality of holes are formed in a base plate, and two mirrored surface elements mutually perpendicular to each other are formed in each of the holes.

Alternatively, the reflective plane-symmetric imaging element can be provided with a plurality of transparent tube shaped protrusions protruding in a direction of a thickness of a predetermined base plate, in which a unit optical element configured from the two mirrored surface elements mutually perpendicular to each other interior is formed on the surface of interior walls of each tube shaped protrusion, and when light passes through the tube shaped protrusions from one side of the base plate to the other, the light is reflected once at each of the two mirrored surface elements. A reflective plane-symmetric imaging element such as that described above can also be made with a comparatively simple construction in which a plurality of tube shaped protrusions are formed in a base plate, and two mirrored surface elements mutually perpendicular to each other are formed in each of the tube shaped protrusions.

According to an optical system provided with a reflective plane-symmetric imaging element such as one of the above-described types, if a unit optical element such one of the above-described types is formed in a regular lattice pattern on the base plate, it becomes possible to obtain an image of a subject of projection having a high degree of definition.

As an alternative to the above-described types of optical systems in which a reflective plane-symmetric imaging element is utilized, the optical system according to the present invention can also be realized by using a metamaterial (see Non-patent Reference: "Revolutionizing Optical Technology, the Superlens" Nikkei Science, October 2006), which is a material that transmits light along a path having a negative refractive index. That is to say, the optical system according to the present invention can be implemented as an optical system in which the optical element provided with a light beam redirecting surface is configured from a metamaterial optical element that is a light beam redirecting surface provided with a planar surface that is in contact with the space in which the subject of projection has been disposed. In the above-described case, the metamaterial optical element is an optical element in which at least the space between the light beam redirecting surface and the mirror surface has been filled with a metamaterial. In order to cause a real image of the subject of projection to be formed at a position that is in plane symmetry with the side of the light beam redirecting surface on which the subject of projection is disposed (i.e., the metamaterial surface), it is desirable that the refractive index of the metamaterial is −1. Further, the position at which the mirror surface is placed can be a position set between the light beam redirecting surface and the position at which the real image of the subject of projection would be formed by the transmitted through the light beam redirecting surface, and the angle at which the mirror surface is placed can be an angle that is set within a range which allows both the incoming light and outgoing light to be transmitted by the light beam redirecting surface. That is to say, any of the configurations shown in FIGS. 1a and 1b is acceptable. Further, in the case that a metamaterial optical element is used, there are no particular restrictions as to the angle of observation.

An even further alternative mode of embodying the optical system according to the present invention, in which the optical element that is provided with a light beam redirecting surface is provided as an afocal 3D optical element, which has a first lens element and a second lens element disposed on the same optical axis as an afocal optical system, and a plurality of the first lens elements are arranged in an array on the same plane and a plurality of the second lens elements are arranged in an array on the same plane so as to form an optical portion having a plurality of the aforementioned afocal optical systems; in which, the afocal optical system can be an afocal optical system provided with an afocal 3D optical element arranged at a front focus position of the second lens element at which an incoming parallel light beam from the first lens element is focused, in which case, a surface perpendicular or an angle close to perpendicular to the optical axis and disposed at a position midway between the lens element 1 and the lens element 2 is the light beam redirecting surface.

In regard to the afocal optical system, the optical system is provided such that the respective focal lengths of the first lens element and the second lens element are counterposed across from each other disposed along the same optical axis, and the incident lens surfaces and the emerging lens surfaces of the afocal optical system are arranged in respective arrays within the same plane. In regard to lens combinations that can be applied as the first lens element and the second lens element, a combination of two convex lenses, two cylindrical lenses, two optical fiber lenses, and the like can be adopted (see Patent Reference: Japanese Laid-open Patent Application 2005-10755). Here, an afocal optical system refers to an optical system in which the focal length is infinitely long. Further, in order to have the image formed at a plane-symmetric position, it is necessary that the respective focal lengths of the first lens element and the second lens element are almost equal.

According to an afocal 3D optical element of a configuration such as that described above, light that has been emitted from the subject of projection and is incoming from the first lens elements of the afocal optical system is regarded as an element image of each respective first lens element, which is then emitted from the second lens elements. Then, the afocal 3D optical element forms a 3D image corresponding to the subject of projection from the entire bundle of light beams of the element images emitted from the lens elements 2. Further, light emitted from the subject of projection is transmitted by the afocal optical element and reflected from the mirror surface before it forms a 3D image at the plane-symmetric position with respect to the light beam redirecting surface on the side opposite that on which the subject of projection is disposed; the reflected light is again transmitted through the afocal 3D optical element in the opposite direction to that when the light was incoming, and a real image of the subject of projection is formed at the position at which an image of the subject of projection would be reflected in a virtual mirror at a plane-symmetric position with respect to the side of the light beam redirecting surface on which the mirror surface is disposed.

According to an optical system utilizing a 3D optical element such as that described above, because light is transmitted mainly from the frontal direction with respect to each lens element, in order to have a configuration in which both direct light and reflected light are capable of being transmitted through both lens elements 1 and 2, it is desirable that the mirror surface is positioned so as to be almost parallel to the light beam redirecting surface, as shown in FIG. 1b. Further, observation of the image must be performed from a direction that is almost perpendicular to the light beam redirecting surface.

Effects Achieved by the Invention

According to the present invention, buy using an optical element that functions to transmit light and form a real image at a plane-symmetric position, and a mirror surface, an optical system having a new type of imaging method, in which a real image of a subject of projection can be viewed appearing as if reflected in a virtual mirror that does not exist as a substantial body, can be created. Accordingly, by looking into the optical system according to the present invention from an appropriate angle and distance, a mirror image (e.g., the face of the observer him or herself) reflected in a virtual mirror can be viewed in space. The image reflected in a virtual mirror obtained in the above-described manner is an image that is formed even closer (to the observer) than the optical system, which is different from the image reflection occurring in a usual flat mirror; therefore, because it is possible for an observer to extend his or her hand and access (touch virtually) the image, the present invention also provides a novel method of communication between the observer and the image.

DETAILED DESCRIPTION OF THE EMBODIMENTS

Hereinafter, preferred embodiments of the present invention will be described in detail with reference to the drawings.

Figure 1:
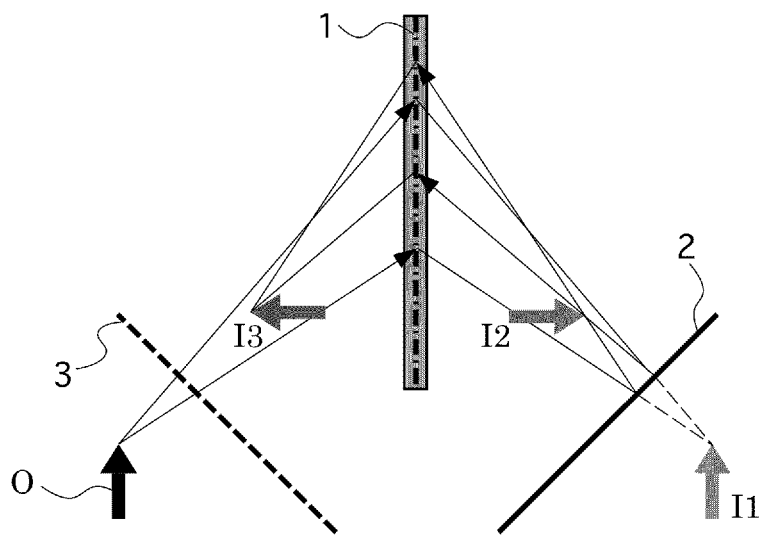
FIG. 1 is a conceptual drawing showing the imaging method of the optical system according to the present invention.
Figure 1:
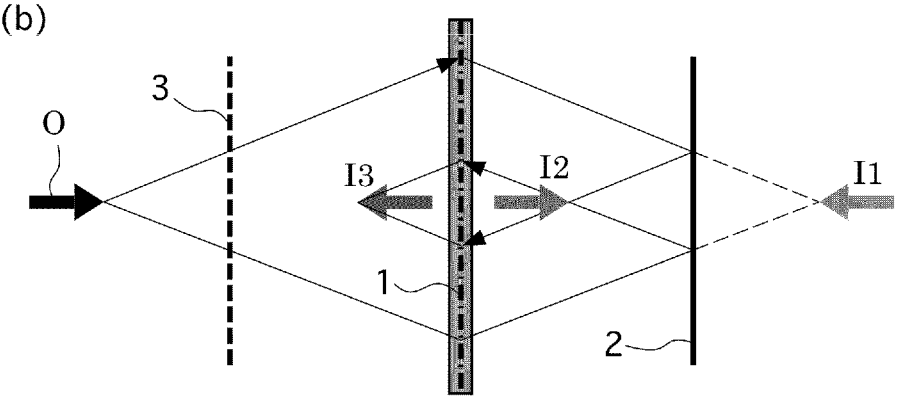
Figure 2:
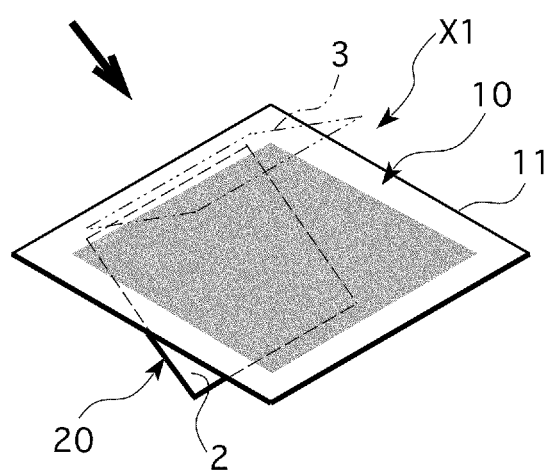
FIG. 2 is a schematic drawing of a perspective view of an optical system according to a first embodiment of the present invention.

FIG. 2 shows a first embodiment of the optical system X1 according to the present invention, comprising a reflective plane-symmetric imaging element 10 that is provided with a light beam redirecting surface having actions of refracting light while transmitting the light and forming an image at a plane-symmetric position, and a plane mirror 20 disposed on an opposite side of the reflective plane-symmetric imaging element 10 to that at which a subject of projection O is disposed across from the subject of projection O. Hereinafter the configuration of each portion of the optical system X1 and the imaging method thereof will be explained.

Figure 3:
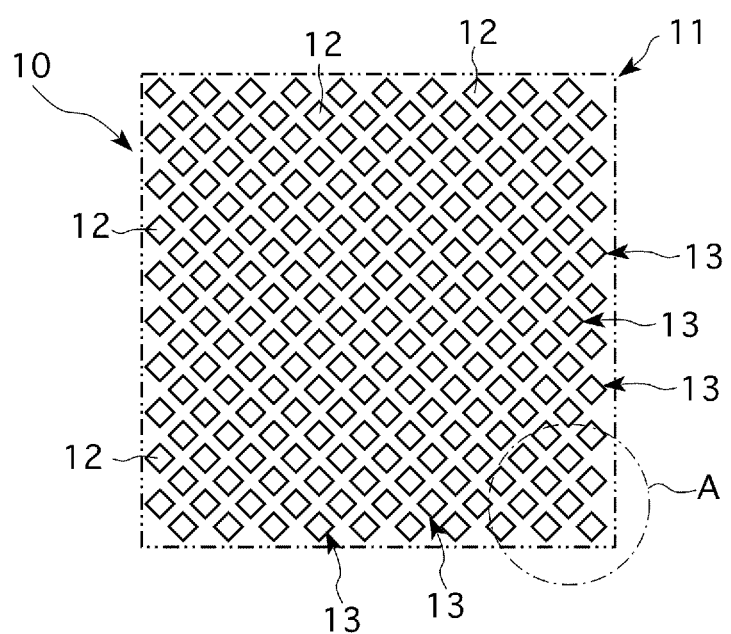
FIG. 3 is a plan view of a plane-symmetric imaging element of the same optical system shown in FIG. 2.

As shown in FIGS. 2 and 3, the reflective plane-symmetric imaging element 10 is provided with a planar base plate 11, in which a plurality of holes 12 are formed across the flat surface thereof so as to penetrate the base plate perpendicularly in a direction of a thickness thereof, and two mirrored surface elements 14a and 14b mutually perpendicular to each other are formed on interior walls of each hole 12 so that each hole 12 can be used as a unit optical element 13.

Figure 4:
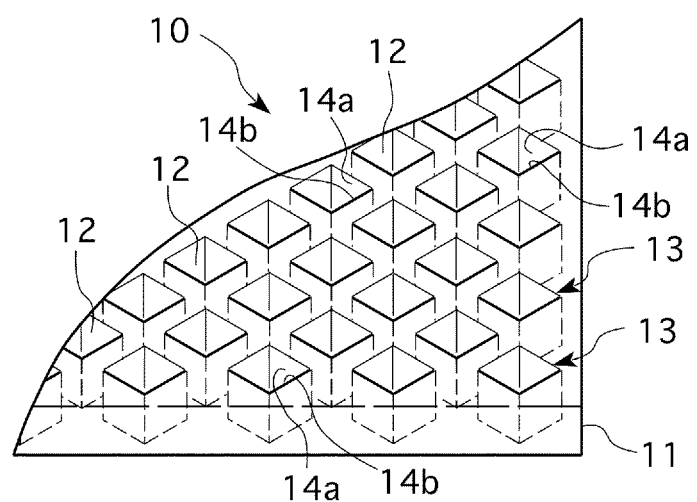
FIG. 4 shows an enlarged perspective view of the plane-symmetric imaging element of the same optical system shown in FIG. 2.

The base plate 11 is a base plate that has a thickness dimension of 50-200 μm, the base plate 11 according to the current embodiment, for example, is a thin panel shape having a thickness of 100 μm; a dimension of 5 cm has been adopted for each of a width and a depth of the base plate 11 according to the present invention, however, the thickness or area of the base plate 11 is not limited to being of the above-described dimensions, and convenient dimensions may be set therefor. As can be seen from the enlargement view shown in the FIG. 4 of the section A of FIG. 3, each unit optical element 13 is a physical and optical hole 12 formed in the base plate 11 for transmitting light. According to the current embodiment, holes 12 that are almost rectangular in the planar perspective (more specifically, the unit optical elements 13 of the current embodiment are square shaped) are applied as the unit optical elements 13, two mutually perpendicular interior walls of each of the holes 12 are subjected to a smooth flat mirror surfacing process to form the mirrored surface elements 14a and 14b, the mirrored surface elements 14a and 14b are made to function as reflective surfaces, and the other portions of the interior walls of the holes 12 are either not subjected to the mirror surface process and left as non-reflecting surfaces or offset at an angle or the like so as to suppress reflected light. The mirrored surface elements 14a and 14b of each unit optical element 13 are all formed facing in the same direction on the base plate 11. In forming the mirrored surface elements 14a and 14b according to the current embodiment, first, a metallic mold is fabricated, and then the interior walls of each hole 12 that are to be made into the mirrored surface elements 14a and 14b are subjected to a nano-scale cutting process to form the mirror surfaces; the surface roughness of the thus processed mirrored surface elements is 10 nm or less, and the surfaces of the mirrored surface elements 14a and 14b are uniform mirror surfaces for reflecting light in the visible spectrum.

More specifically, each of the unit optical elements 13 has a side, for example, that is 50-200 μm, preferably 100 μm according to the current embodiment, and by applying a pressing procedure using the metallic mold which has been made in advance in a nano-scale imprinting process or an electroforming process, a plurality of the holes 12 are formed at a predetermined pitch in the base plate 1. According to the current embodiment, each side of each unit optical element 13 extending in the direction of a length or a width thereof is offset at an angle of 45 degrees with respect to the direction of the width or depth of the base plate 11, and two different and arbitrary unit optical elements 13 are mutually parallel to each other. However, it is also possible that two different and arbitrary unit optical elements 13 can be disposed not parallel to each other, but at a variety of angles (i.e., randomly). By offsetting the unit optical elements 13 at an angle with respect to the base plate 11, the stray light generated by once reflected light becomes further diffused, and the angle of the lateral field of vision of twice reflected light becomes wider because the peak for the angle of the field of vision of the transmission rate levels off. Note that by setting the dimension of the interval separating adjacent unit optical elements 13 as small as possible, the transmission rate can be raised. Then, the portion of the base plate 11 other than the portion on which the unit optical elements 13 have been formed is subjected to a light blocking process, and a reinforcing member (not shown in the drawings) forming a thin panel shape is provided on the upper face and the lower face of the base plate 11. Note that, it goes without saying that each of the unit optical elements 13 is provided so as to not be covered by the panel shaped reinforcement member. According to the current embodiment, the number of individual unit optical elements 13 provided on the base plate 11 is from several tens of thousands to several hundreds of thousands.

As an alternative method of forming the mirrored surface elements, if the base plate has been formed from aluminum, nickel, or another metal by use of an electroforming process; whereby, in so far as the surface roughness thereof is sufficiently small, the mirrored surface elements 14a and 14b are naturally formed by the surfaces of the interior walls of the holes 12. Further, in the case that the base plate 11 has been made from a resin or the like by use of a nano imprinting process, to fabricate the mirrored surface elements 14a and 14b, it is necessary to provide a mirror coating by use of a sputtering method or the like.

The unit optical elements 13 formed on the base plate 11 in the above-described manner function to reflect light entering the holes 12 from the side of the front surface of the base plate 11 (or the rear surface of the base plate 11) at one of the mirrored surface elements 14a or 14b, reflect the light at the other of the mirrored surface elements (14a or 14b), and transmit the thus twice reflected light through the rear surface of the base plate 11 (or the front surface of the base plate 11), and, when viewed from the side, because the path of the transmitted light form an ingress path and a projection path that sandwich the base plate 11 and are in plane symmetry, the aggregate of unit optical elements 13 on the base plate 11 form the reflective plane-symmetric imaging element 10. That is to say, the light beam redirecting surface of the reflective plane-symmetric imaging element 10 (i.e., the surface that passes alongside all of the mirrored surface elements 14a and 14b and is perpendicular to the mirrored surface elements) becomes a light beam redirecting surface 1 that forms a real image of a real object disposed on one side of the base plate 11 on the other side of the light beam redirecting surface 1 (shown as an imaginary line in the drawings; surfaces assumed to pass through the center portion of the thickness of the base plate 11).

On the other hand, the plane mirror 20 is a flat mirror surface 2 that faces the base plate 11, and the mirror surface 21 is disposed to the rear side of the base plate 11 so as to form an acute angle (45 degrees in the drawing) with the light beam redirecting surface 1 of the reflective plane-symmetric imaging element 10. The position of the plane mirror 20 is on the path of light emitted from the subject of projection O and transmitted to the imaging position by the reflective plane-symmetric imaging element 10; wherein, a condition is stipulated in that the position of the plane mirror 20 must be set closer to the base plate 11 than the imaging position. Note that the shape, size, or angle of the plane mirror 20 can be set to convenient values. Further, the optical system X according to the current embodiment can be provided as a box shaped device wherein the base plate 11 serves as a lid, for example, in which case the plane mirror 20 is disposed within the box.

Figure 5:
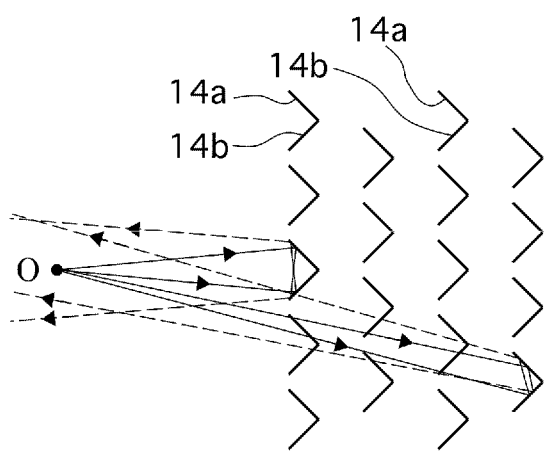
FIG. 5 is an illustration showing the state in which light is transmitted and refracted by the plane-symmetric imaging element.
Figure 6:
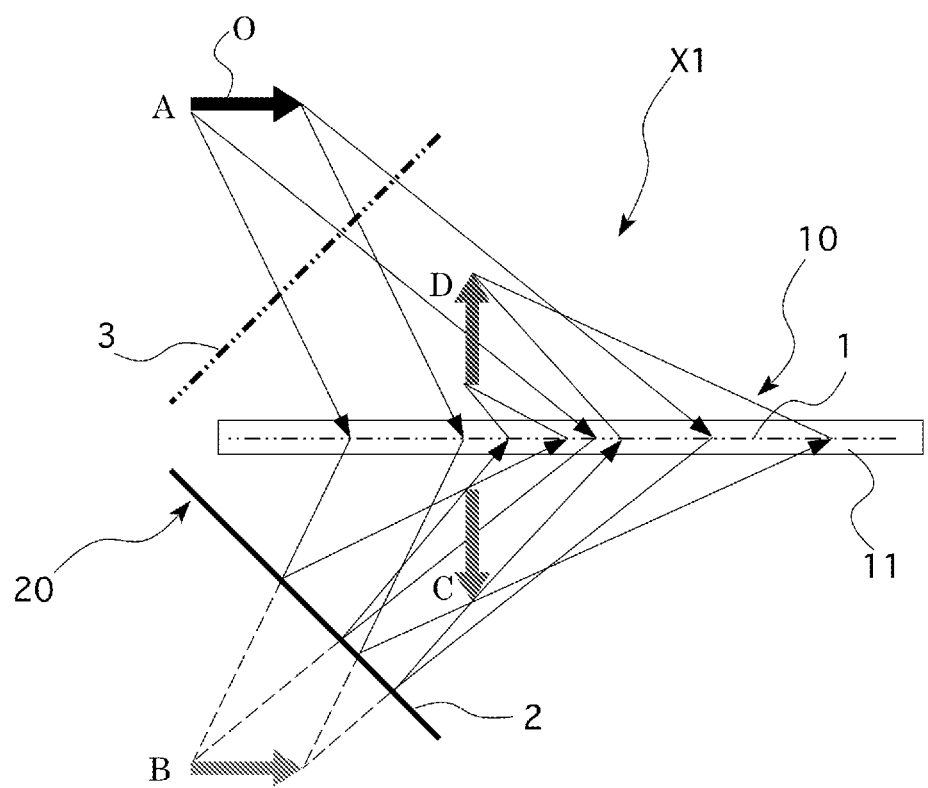
FIG. 6 is an illustration of the imaging method according to the same optical system shown in FIG. 2.

Hereinafter an explanation of the imaging method and the light path of light emitted from the subject of projection O employed in the optical system X1 according to the current embodiment is provided. First, as shown in the plan view illustration of FIG. 5, when light emitted from the subject of projection O (the directions indicated by the arrows along the solid lines, proceeding three-dimensionally from in front of the surface of the sheet of paper toward the interior depth of the sheet of paper), is transmitted by the reflective plane-symmetric imaging element 10 (the light paths of the transmitted light are shown by the broken lines), because the light is first reflected by one of the mirrored surface elements 14a (or 14b) and then again reflected by the other mirrored surface element 14b (or 14a), if the mirror surface 2 was not present, an image of the subject of projection O would be formed at a position in plane symmetry to the subject of projection with respect to the light beam redirecting surface 1 of the reflective plane-symmetric imaging element 10. However, due to the presence of the mirror surface 2, the transmitted light is reflected by the mirror surface 2 before forming an image. Accordingly, as shown in the side view illustrated in FIG. 6, light emitted from the subject of projection O (shown by the thick arrow mark at a position A), the image formed by the reflective plane-symmetric imaging element 10 (a position B) comes to be formed as an image at the position in plane symmetry with the mirror surface 2 (a position C). When light from the image occurring at the position C is transmitted is transmitted to the opposite side from that from which it was transmitted earlier, that is to say, when the light emitted from the image occurring at the point C is transmitted through the light beam redirecting surface 1 from the rear side of the base plate 11 to the front side of the base plate 11 the light is reflected one time each at each of the two mirrored surface elements 14a and 14b, and formed as a real image at the position in place symmetry with the light beam redirecting surface 1 (a point D). Here, at the position plane-symmetric to the mirror surface 2 with respect to the light beam redirecting surface 1 of the reflective plane-symmetric imaging element 10, if we consider a virtual mirror 3 that does not actually existence as a substantial body, the subject is located at the position A and the image at the position D are in a relation of plane symmetry with respect to the virtual mirror 3. That is to say, by using the optical system X according to the current embodiment, it becomes possible to view an image of the subject of projection O in the middle of space as if reflected in a mirror in space at which it appears that nothing exists. Note that, the thick arrow mark in FIG. 2 shows the observation direction for viewing the image formed by the optical system X according to the current embodiment, said observation direction being from above the reflective plane-symmetric imaging element 10 at a diagonal.

Figure 7:
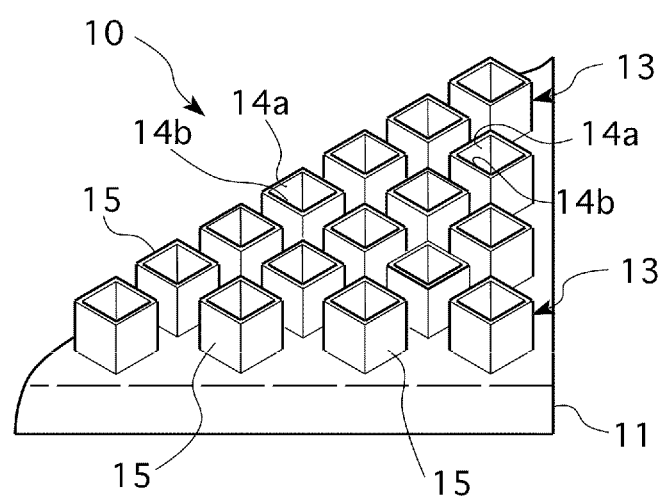
FIG. 7 shows an alternative embodiment of the plane-symmetric imaging element applied in the same optical system shown in FIG. 2.

Note that according to the reflective plane-symmetric imaging element 10 such as that described above, instead of an embodiment in which the two mirrored surface elements 14a and 14b mutually perpendicular to each other are formed on interior walls of the holes 12, as shown in the enlargement view of FIG. 7, a plurality of transparent tube shaped protrusions 15 can be formed protruding in a direction of a thickness of the base plate 11 in a grid pattern, and the two mirrored surface elements 14a and 14b can be formed on two mutually perpendicular interior wall surfaces among the interior wall surfaces of each transparent tube shaped protrusion 15. The mirrored surface elements can also use total reflection, and the reflection from a reflective film can also be used. In this case, by offsetting at an angle the interior walls of the tube shaped protrusions 15 other than the interior walls on which the mirrored surface elements 14a and 14b have been formed, excessive reflection can be eliminated and a clearer image obtained.

Figure 8:
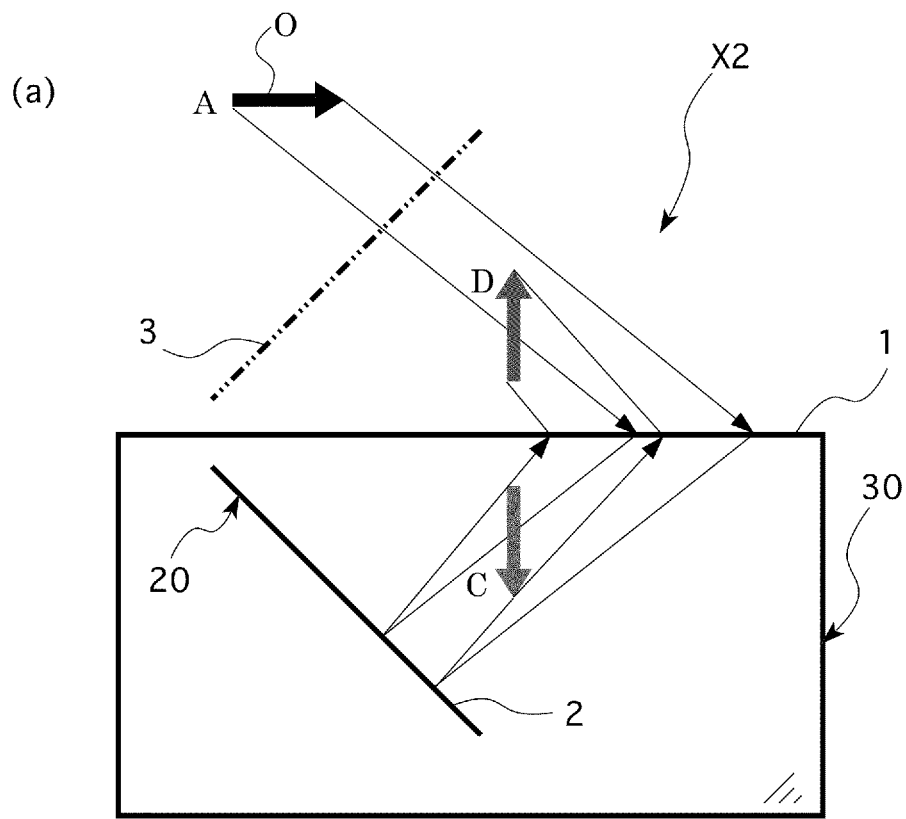
FIG. 8 is an illustration showing an optical system and imaging method according to a second embodiment of the present invention.
Figure 8:
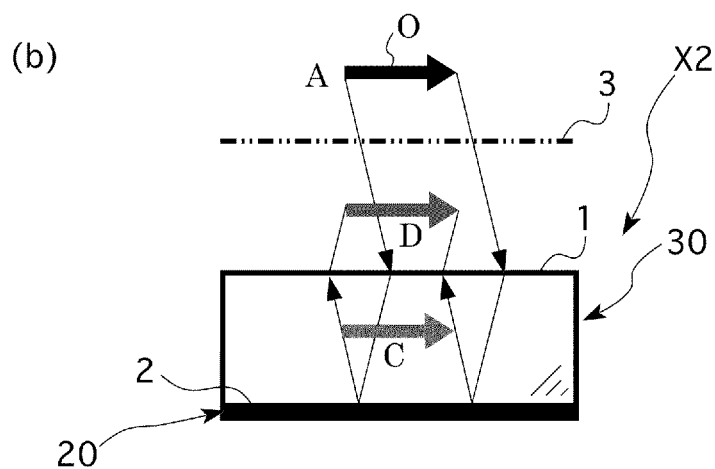

Further, the second embodiment of the optical system X2 according to the present invention, as shown in FIG. 8a, comprises a metamaterial optical element 30 formed of a metamaterial, which is a material that has a negative refractive index, and a plane mirror 20. In a metamaterial, when light from a medium having a positive refractive index (e.g., the atmosphere) enters the metamaterial, the incident light on the surface of the metamaterial (i.e., the light beam redirecting surface 1) is refracted and proceeds through the metamaterial on the same side of the normal through the surface of the metamaterial. In the example shown in the drawing, a real image should be formed at the plane-symmetric position, and a material having a refractive index of –1 has been adopted as the metamaterial. According to the optical system X2 shown in the same drawing, the interior of the metamaterial optical element 30 formed by a metamaterial shaped as a rectangle is provided with a configuration in which the plane mirror 20 having the mirror surface 2 is disposed at a predetermined angle (e.g., 45 degrees) facing the refractive surface 1, which is the surface of the metamaterial optical element 30 that faces the subject of projection O.

Hereinafter an explanation of the light path of light emitted from the subject of projection O along with the imaging method employed in the optical system X2 according to the current embodiment is provided. According to the optical system X2, light emitted from the subject of projection O (at a position A) is refracted at the surface of the metamaterial optical element 30 (i.e., the light beam redirecting surface 1) toward the direction of the same side of the normal as the incident light came from, proceeds through the interior of the metamaterial optical element 30, and is reflected from the mirror surface 2 and formed as an image (at a position C); the reflected light is again refracted by the surface of the metamaterial optical element 30 (the light beam redirecting surface 1), transmitted through the light beam redirecting surface 1 and emitted into the exterior space on the other side thereof to form an image at a position D. Here, in the same manner as described for the optical system X1 according to the first embodiment of the present invention, if we consider a virtual mirror 3, which does not exist as a substantial body, at the position plane-symmetric to the mirror surface 2 with respect to the light beam redirecting surface 1 of the metamaterial imaging element 30, the subject of projection O disposed at the position A and the image formed at the position D' are in a relation of plane symmetry with respect to the virtual mirror 3. That is to say, by using the optical system X2 according to the current embodiment, it becomes possible to view an image of the subject of projection O in the middle of space as if reflected in a mirror where nothing exists.

Note that the position at which the plane mirror 20 is disposed and the angle at which the plane mirror 20 is disposed can be set to arbitrary values so long as the incoming light and outgoing light can both be transmitted by the light beam redirecting surface 1; for example, as shown in FIG. 8b, the plane mirror 0 can also be disposed so that the mirror surface 2 is parallel to the surface of the metamaterial optical element 30 (the light beam redirecting surface 1). In this manner, according to the optical system X2 employing the metamaterial optical element 30, because it is sufficient that the area in which incoming light and outgoing light is transmitted between the light beam redirecting surface 1 and the mirror surface 2 is filled with a uniform metamaterial, as shown in the example depicted in the drawing, an embodiment in which the metamaterial optical element 30 can be formed as a rectangular block, and the plane mirror 20 is disposed so that the light beam redirecting surface 1 is in close contact with the mirror surface 2 on the opposing side.

Figure 9:
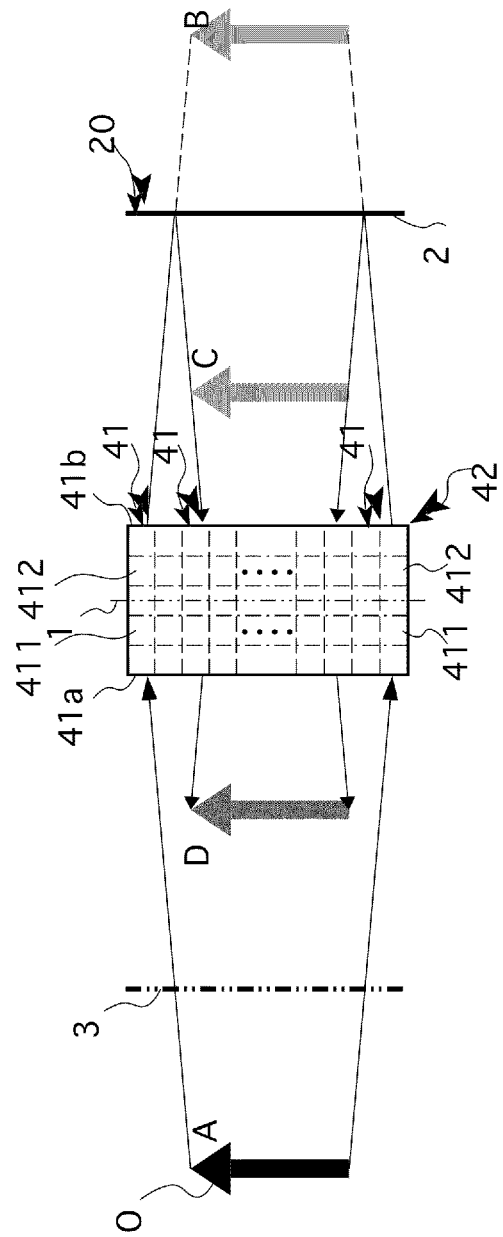
FIG. 9 is an illustration showing an optical system and imaging method according to a third embodiment of the present invention.
Figure 10:
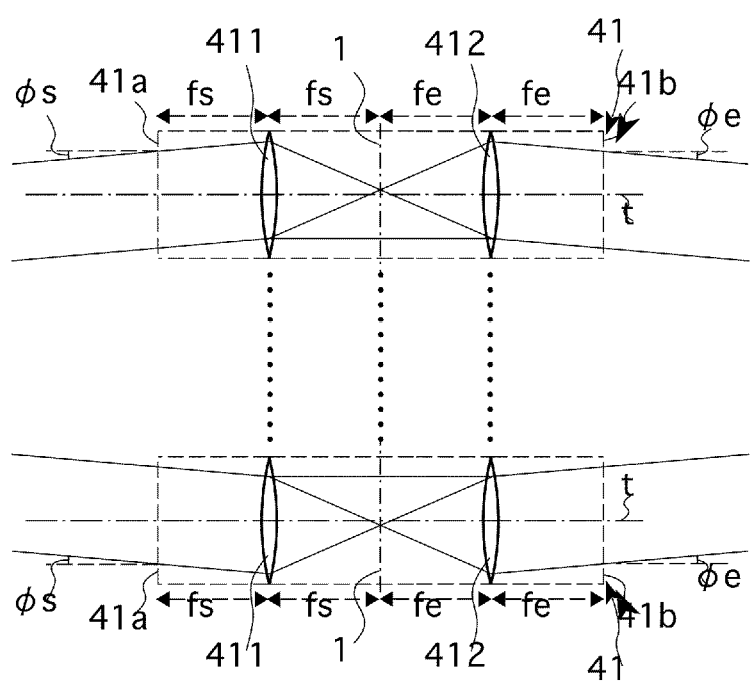
FIG. 10 is an illustration showing light being transmitted by the afocal optical system according to the same optical system shown in FIG. 9.

Further, a third embodiment of an optical system X3 according to the present invention, as shown in FIGS. 9 and 10, comprises an afocal 3D optical element 40, and a plane mirror 20. The afocal 3D optical element 40 comprises an optical portion 42 provided with a plurality of afocal lens 41, each of which is a single afocal optical system, disposed in an array. The afocal lenses 41 comprise a first lens element 411 and a second lens element 412 disposed along the same optical axis t, the first lens elements 411 and second lens elements 412 being disposed so as to be counterposed in pairs one facing the other separated from each other by an interval equal to the combined total of the respective focal distances fs and fe of each respective counterposed lens element. According to the afocal 3D optical element 40, by disposing an incident lens surface of the first lens elements 411 of the afocal lens 41 in an array on the same plane, and disposing an emerging lens surface of the second lens elements 412 of the afocal lens 41 in an array on the same plane, the optical portion 42 is be configured from a plurality of afocal lenses 41. Note that the incident surface 41a and the emerging surface 41b of the afocal lens 41 are formed at the respective positions that become the focal distances of the first lens elements 411 and the second elements 412, which are each disposed on respective same planes, and are formed in a continuous manner with the positions that become the focal distances of a plurality of first lens elements 411 and a plurality of second lens elements 412, respectively; that is to say, the incident surface 41a and the emerging surface 41b are shown as being formed across the entirety of the surfaces on the front side and the rear side of the optical portion 42, respectively. Here, according to the current embodiment, the afocal optical system (i.e., the afocal lens 41) is an afocal optical system in which the first lens elements and the second lens elements are disposed along the same optical axis t and in a manner such that the position of the rear focus of each of the first lens elements and the position of the front focus of each respective second lens element match.

The current embodiment is an embodiment in which convex lenses have been used for both the first lens elements 411 and the second lens elements 412 that form the afocal lens 41. As to the relationship between the positions of the first lens elements 411 and the second lens elements 412 that form the afocal optical system and are disposed along the same optical axis t (coaxial position), as shown in FIG. 10, the lens elements are disposed so as to form an afocal lens 41 in which the respective focal distances fs and fe of the lens elements are mutually separate. According to the afocal 3D optical element 40, if we consider the light beam occurring on the optical axis t of each afocal lens 41, the aggregate of the entire bundle of light beams comprising the light beam of each element image formed by each lens element as a whole forms a 3D optical image. In the case that the focal distances fs and fe are equal, the 3D optical image is formed at the position in plane symmetry to the light beam redirecting surface with respect to the subject of projection O.

The plane mirror 20 is disposed on the opposite side of the second lens elements 412 from the first lens elements 411 at a position closer to the afocal lens 41 than the imaging position at which a 3D optical image is formed by afocal 3D optical element 40, such that the mirror surface 2 is almost perpendicular to the optical axis t of the first lens elements 411 and the second lens elements 412.

Hereinafter, the light path of light emitted from the subject of projection O and the imaging method used by the optical system X3 according to the current embodiment are explained. As shown in the FIGS. 9 and 10, when light emitted from the subject of projection O (the directions indicated by the arrows along the solid lines), is transmitted by the afocal 3D optical element 40, first, light enters the incident surface 41a at an angle of incidence φs, is refracted by each first lens element 411, is again refracted by each second lens element 412, and is emitted from the emerging surface 41b at an angle of emission φe. However, in the case that the focal distances fs and fe are equal, the angle of incidence φs and the angle of emission φe become equal angles. If the mirror surface 2 were not present, the light emitted from the emerging surface 41b would be formed as an image at the position plane-symmetric to the subject of projection O with respect to the light beam redirecting surface 1 of the afocal 3D optical element 40 (i.e., at a position B); however, because the mirror surface 2 is present, the light is reflected by the mirror surface 2 and formed as an image at a position in plane symmetry to the mirror surface 2 with respect to the image at the position B (i.e., at a position C). The light forming the image occurring at the position C again enters the afocal 3D optical element 40 at the emerging surface 41b at an angle of φe, is refracted by the second lens elements 412 and also by the first lens elements 411, and is emitted from the incident surface 41a at an angle of φs. Then, at the same position D where an image of the subject of projection O is formed with respect to the virtual mirror 3 in plane symmetry to the mirror surface 2 with respect to the light beam redirecting surface 1, a real image of the subject of projection O (a virtual mirror image) is formed. Observation of the image is performed from the direction of the optical axis of the first lens elements 411 and the second lens elements 412 facing toward the first lens elements 411. That is to say, by using the optical system X3 according to the current embodiment, too, it becomes possible to view an image of the subject of projection O in the middle of space as if reflected in a mirror where nothing exists.

Note that, according to the current embodiment, aside from the convex lenses have been used as the first and second lens elements described above, it is also possible to apply lens elements utilizing a combination of fiber optical lenses and fiber optical lenses, and the like therefor.

The present invention is not limited to the above-described embodiments. In addition, a specific configuration of each part or component is also not limited to the above described embodiments; so long as the gist of the present invention is not deviated from, any number of variations is possible.

INDUSTRIAL APPLICABILITY OF THE INVENTION

The optical system according to the present invention may be used as a new type of display system in which a mirror image, of a real object including three dimensions is formed at a position at which it would be formed as if it had been reflected from a mirror that exists virtually in space, but does not exist as a substantial body.

I claim:
1. An optical system, comprising:
a light beam deflecting surface which functions to deflect light while transmitting the light and form a real image at a plane-symmetric position, and
a mirror surface disposed facing the light beam deflecting surface;
wherein an image of a subject of projection that has been disposed on an observation side opposite a side on which the mirror surface has been disposed across the light beam deflecting surface, is formed in a manner equivalent to an image that would be formed by a light beam from the subject of projection reflected on said mirror, if said mirror was moved from said mirror's actual position into a position that is plane symmetric with respect to the light beam deflecting surface, by reflecting the transmitted light from the mirror surface, and again transmitting the reflected light through the light beam deflecting surface.

2. An optical system according to claim 1, in which the light beam deflecting surface is provided in an optical element, comprising:
a reflective plane-symmetric imaging element formed from a plurality of unit optical elements, each of said unit optical elements being provided with two mirrored surface elements mutually perpendicular to each other, arranged on a plane;
wherein light transmitted from one side to the other side of the light beam redirecting surface of the reflective plane-symmetric imaging element is reflected once by each of the two mirrored surface elements of each unit optical element, and
wherein the light beam redirecting surface is a light beam redirecting surface that passes alongside the two mirrored surface elements and is disposed perpendicularly or at an angle close to perpendicular with respect to the two mirrored surface elements.

3. An optical system according to claim 2, wherein the reflective plane-symmetric imaging element is provided with a plurality of holes penetrating in a direction of a thickness of a predetermined base plate,
wherein the unit optical elements configured from the two mirrored surface elements mutually perpendicular to each other are formed on interior walls of each hole, and
wherein when light is transmitted through the holes from one side of the base plate to the other, the light is reflected once at each of the two mirrored surface elements.

4. An optical system according to claim 2, wherein the reflective plane-symmetric imaging element is provided with a plurality of transparent tube shaped protrusions penetrating in a direction of a thickness of a predetermined base plate,
wherein the unit optical elements configured from the two mirrored surface elements mutually perpendicular to each other are formed on interior walls of each tube shaped protrusion, and
wherein when light is transmitted through the tube shaped protrusions from one side of the base plate to the other, the light is reflected once at each of the two mirrored surface elements.

5. An optical system according to claim 3, wherein the unit optical elements are formed in a regular lattice pattern on the base plate.

6. An optical system according to claim 1, in which the light beam deflecting surface is provided in an optical element, comprising:
- a planar metamaterial optical element that is a surface which is in contact with a space in which the subject of projection has been disposed and is configured as a planar light beam redirecting surface;
- wherein the metamaterial optical element is an optical element in which at least the space between the light beam redirecting surface and the mirror surface is filled with a metamaterial.

7. An optical system according to claim 1, in which the light beam deflecting surface is provided in an optical element, comprising:
- an afocal optical system provided with a first lens element and a second lens element disposed along the same optical axis,
- an optical portion having a plurality of the first lens elements disposed in an array on a single plane and a plurality of the second lens elements disposed in an array on a single plane, thereby configuring a plurality of the afocal optical systems, and
- an afocal 3D optical element that is provided with the optical portion;
- wherein the afocal optical system is further provided with an afocal 3D optical element disposed at a front focus position of the second lens elements at which an incoming parallel light beam from the first lens elements is focused, and
- wherein the light beam redirecting surface is a surface at a right angle or an angle close to perpendicular to the optical axis at a position midway between the first lens elements and the second lens elements.

8. An optical system according to either claim 4, wherein the unit optical elements are formed in a regular lattice pattern on the base plate.

9. An optical system, comprising:
- a light beam deflecting surface, in which the light beam deflecting surface can deflect and transmit lights to form a real image at a plane-symmetric position; and
- a mirror surface facing the light beam deflecting surface,
- wherein a subject of projection is disposed on an observation side opposite to the mirror surface with respect to the light beam deflecting surface,
- wherein light emitted from the subject of projection is deflected by, and transmitted through, the light beam deflecting surface, and then, reflected by the mirror surface to form a first image;
- wherein the first image is then deflected by, and transmitted through, the light beam deflecting surface to form a second image on the observation side.

* * * * *